(12) United States Patent
Bach et al.

(10) Patent No.: US 8,133,526 B2
(45) Date of Patent: Mar. 13, 2012

(54) FAT COMPOSITIONS

(75) Inventors: Mogens Bach, Aarhus C (DK); Bjarne Juul, Tranbjerg J (DK)

(73) Assignee: Aarhuskarlshamn Denmark, Aarhus C (DK)

( * ) Notice: Subject to any disclaimer, the term of this patent is extended or adjusted under 35 U.S.C. 154(b) by 1213 days.

(21) Appl. No.: 11/576,574

(22) PCT Filed: Oct. 7, 2005

(86) PCT No.: PCT/DK2005/000647
§ 371 (c)(1),
(2), (4) Date: May 11, 2007

(87) PCT Pub. No.: WO2006/037341
PCT Pub. Date: Apr. 13, 2006

(65) Prior Publication Data
US 2007/0269468 A1    Nov. 22, 2007

(30) Foreign Application Priority Data

Oct. 8, 2004    (DK) .................................. 2004 01549

(51) Int. Cl.
*A23D 7/00* (2006.01)
*A23D 9/00* (2006.01)
(52) U.S. Cl. ....................................... 426/607; 426/601
(58) Field of Classification Search .................. 426/607, 426/601; 514/558, 559, 560
See application file for complete search history.

(56) References Cited

U.S. PATENT DOCUMENTS

| | | | |
|---|---|---|---|
| 3,686,240 A | 8/1972 | Kawada et al. | |
| 4,839,192 A | 6/1989 | Sagi et al. | |
| 5,858,445 A | 1/1999 | Huizinga et al. | |
| 6,231,914 B1 | 5/2001 | Huizinga et al. | |
| 7,309,508 B2 * | 12/2007 | Bach et al. ................. 426/607 |
| 2003/0068426 A1 | 4/2003 | Idris et al. | |
| 2005/0163909 A1 | 7/2005 | Cleenewerck et al. | |

FOREIGN PATENT DOCUMENTS

| | | |
|---|---|---|
| EP | 0536824 | 4/1993 |
| EP | 0545463 | 6/1993 |
| EP | 0803196 | 10/1997 |
| EP | 1038444 | 9/2000 |
| JP | 63112948 A A | 5/1988 |
| JP | 2138937 A U | 11/1990 |
| JP | 2269199 A A | 11/1990 |
| JP | 5088094 B A | 4/1993 |
| JP | 6014717 A A | 1/1994 |
| WO | 95/14392 | 6/1995 |
| WO | 96/14755 | 5/1996 |
| WO | 03/037095 | 5/2003 |
| WO | 03/053152 | 7/2003 |

OTHER PUBLICATIONS

Frank D. Gunstone, Lipid Glosary 2, The Oily Press Lipid Library, vol. 12 (2000).
Sorbitan Tristearate, 39th JECFA, INS No. 492 (1992).
Elisabettini P et al., "Effect of Sorbitan Tristearate on the Thermal and Structural Properties of Monoacid Triglycerides—Influence of CIS or Trans Double Bond," Fat Science Technology, vol. 97, No. 2, pp. 65-69, XP001006940 (1995).
Satsuki Hasimoto et al., JAOCS, vol. 78 (5), 455-460 (2001).
Iwao Hachiya et al., JAOCS, vol. 66 (12), 1763-1770 (1989).
Uncertified, English language translation of Communication of the Japanese Patent Office, mailed Sep. 27, 2011, in connection with counterpart Japanese Patent Application No. 2007-535022.

* cited by examiner

*Primary Examiner* — Kevin E Weddington
(74) *Attorney, Agent, or Firm* — Fish & Richardson P.C.

(57) ABSTRACT

Low-lauric, low-trans fat compositions useful for food and other applications.

17 Claims, 2 Drawing Sheets

Fig. 1

FAT COMPOSITIONS

CROSS REFERENCE TO PRIOR APPLICATION

This application is a U.S. national phase of International Patent Application Serial No. PCT/DK2005/000647, filed Oct. 7, 2005, which claims priority from Danish Patent Application Serial No. PA 2004 01549, filed Oct. 8, 2004 the disclosure of both are incorporated herein by reference in their entirety.

FIELD OF THE INVENTION

The present invention relates to low-lauric, low-trans fat compositions having a fast solidification rate and that solidifies in a stable form.

The predominant fatty acid moieties of the triacylglycerols (TAG) in the fat compositions are: palmitic, stearic, arachidic, oleic, linoleic and linolenic acid. Further, a minor amount of C18-trans-unsaturated fatty acid moieties may be present.

The fat compositions are useful in food and non-food applications.

BACKGROUND OF THE INVENTION

The high-melting fractions of lauric oils, e.g. palm kernel oil, are known as cocoa butter substitutes (CBS). They are used as ingredients in confectioneries, suppositories, lip balms, etc.

Lauric CBSs solidify in a stable crystal form, which does not require a complicated "tempering". Tempering is the controlled formation of a sufficient number of stable seed crystals that ultimately produce the desired crystal form during solidification. Some of the main drawbacks of lauric CBSs are low cocoa butter tolerance, and when used as filling fat they will migrate into the surrounding chocolate shell, eventually leading to bloom. Furthermore, when exposed to moisture and if fatsplitting enzymes are present, there is a risk of hydrolysis giving the product an undesirable, soapy flavour.

Non-lauric, non-temper alternatives to CBSs are trans-hydrogenated and fractionated triglyceride mixtures based on soybean oil, rapeseed oil, sun-flower oil, palm oil or other similar oils and fats. They are known as non-lauric CBSs or cocoa butter replacers (CBR) with a fair cocoa butter tolerance.

They are non-temper fats, but they have a slower solidification rate than lauric CBSs. Furthermore, they suffer from the drawback of containing a high amount of trans-fatty acids e.g. 40% or more in the glycerides that may increase the blood cholesterol level and the risk of coronary heart disease if contained in the diet. As a result of this, consumers are increasingly looking for foods without these trans-fatty acids.

Non-trans, non-lauric alternatives are cocoa butter (CB) and cocoa butter equivalents (CBE). The production of CBEs is based on fractions of fats containing the same triglycerides as CB, e.g. palm oil, shea butter, illipe, etc. The main part of the triglycerides is of the symmetric SUS type (S=saturated fatty acids, U=unsaturated fatty acids) or more specifically, StOSt, POSt and POP (P=palmitic acid, St=stearic acid, O=oleic acid).

CB and CBE exist in a number of polymorphic forms, and the nature of the crystalline form depends on the method of cooling of the liquid fat. If the fat is allowed to crystallise in an unstable form, it recrystallises after a time delay. In the production of chocolate this transformation will cause a change from a nice glossy chocolate to a dull or mouldy looking chocolate. This phenomenon, "fat-bloom", is avoided by the tempering of the chocolate. In the tempering process the liquid chocolate is cooled down to produce both stable and unstable crystals followed by heating to a temperature above the melting point of the unstable crystals, leaving only stable seed crystals.

Tempering is a complicated and expensive process, and consequently there is a need for fat compositions that do not require tempering i.e. that solidifies in a stable form, and at the same time has a low content of lauric and trans-fatty acids.

DESCRIPTION OF RELATED ART

Fats that do not contain trans-fatty acids can be obtained by dry and/or solvent fractionation of oils with a natural content of higher melting triglycerides. Non-lauric fats can be produced by fractionation of suitable oils, e.g. palm oil.

Palm midfractions (PMF) are known in the industry. PMFs are rich in the SUS type of triglycerides of which POP is predominant. The PMFs suffer from the drawback that they need pre-crystallisation or seeding to crystallise fast in a stable form. Without pre-crystallisation or seeding during cooling the PMF will re-crystallise leading to bloom when used in chocolate or post-hardening when used as a filling fat or as hardstock in margarine.

Preparation of hard PMF and its use as non-lauric CBS in chocolate is described in literature (Satsuki Hashimoto et al. 2001. JAOCS vol. 78 (5), 455-460). It was experimentally demonstrated that PMFs with a high content of POP and StOP produce chocolate just as good as conventional CB based chocolate, except for a reduction in bloom resistance. Addition of 1% polyglycerol fatty acid ester (i.e. hexaglycerol octastearate) as an anti-bloom agent improved the stability to an extent that was expected to be sufficient for commercial use.

EP 1 038 444 A1 teaches how to produce hard butter compositions by the fractionation of soft PMF. To the hard butter is added 1-5%, more preferably 2.5-5%, of polyglycerol fatty acid esters with a polymerisation degree of glycerol of 4-8, the fatty acid residues of which are exemplified by: palmitic, stearic, oleic and behenic acid. The added emulsifier acts as a bloom retardant. The fat compositions are used in chocolate.

Seeding effects and fat bloom properties of dark chocolate are described in literature (Iwao Hachiya et al. 1989. JAOCS vol. 66 (12), 1763-1770). In the experiments CB powder (form VI), StOSt powder ($\beta_1$ form), BOB (B=behenic acid) powder (pseudo-$\beta'$ and $\beta_2$ form) and StStSt powder ($\beta$ form) was used as seed crystals. The fat bloom stability was tested, and in a 38/20° C. cycle test, BOB ($\beta_2$ form) proved to be the best seed material to prevent fat bloom at a concentration of 5%.

U.S. Pat. No. 4,839,192 teaches a hard butter composition for use in confectionery such as chocolate wherein it improves high-temperature resistance and anti-bloom properties. The main ingredient of the composition is SUS-type of glycerides. The SUS amount is 50% or more, more preferably 65% or more. The constituent saturated fatty acids thereof contains 4-30% of one or a plurality of fatty acids selected from the group consisting of behenic, lignoceric, cerotic, and arachidic acid. The fat having the desired triglyceride composition can be produced by selective transesterification of monovalent alcohol esters of abovementioned fatty acids into $\alpha$ and $\alpha$ positions of a fat or oil rich in unsaturated fatty acid residues in the $\beta$ position thereof. In the reference example 3 it is shown that non-selective random transesterification, even after solvent fractionation was carried out, resulted in a product that had poor miscibility with CB (i.e. difficulty in uniform crystallisation) and inferior melting property in the mouth. The hard butter claimed in the patent can optionally be mixed with other SUS rich fats such as PMF to give a hard butter composition comprised by the patent.

EP 0 536 824 B2 teaches a fat that does not need to be tempered and that does not contain trans fatty acids or lauric fats. The fat composition consists predominantly of triglycerides with more than 50% POP triglycerides that are capable of crystallising in the β crystal form. The fat is externally added a minimal working amount of a fat component capable of stabilising β' crystals. This added fat comprises at least a triglyceride of the SSO-type and/or a triglyceride of the SSS-type, and it also contains an SOO-type triglyceride in such an amount, that the weight ratio SSO/SOO is at least 3.0, preferably at least 5.0, where S=saturated fatty acids C10-C24. Although the triglyceride capable of crystallising in the β form in general will contain some SSO and/or SSS, the amount is insufficient to stabilise the β' form. Therefore, it is necessary to add externally an effective amount of SSO or SSS, or a mixture thereof. The amount of SSO in the total fat composition should be 8-40%, preferably 10-20%. The SSO component is preferably derived from palmitic and/or stearic as saturated fatty acids. The best results are obtained in combination with an SSS fat. The amount of SSS is 2-20%, preferably 3-15%. An example of such a fat, which can be obtained from the hardening of PMF, is PStP. A preferred amount of PStP is 2-10% of the total fat in the composition.

WO 95/14392 teaches blends of a sugar and a triglyceride component suitable for the preparation of filling fat compositions and ice-cream coatings with a low content of saturated fatty acids. The triglyceride component has a content of max. 45% saturated fatty acids and comprises at least 40% of $SU_2$ triglycerides and 3-50% of $S_2U$ triglycerides. S being saturated fatty acids with 18-24 carbon atoms, and U being unsaturated fatty acids with 18 or more carbon atoms. Suitable triglyceride compositions are compositions rich in BOO, StOO, OStO, OBO or mixtures thereof. As the $S_2U$ component the composition will also contain BOB, BBO, StOSt or StStO. Such triglycerides can be made by interesterification of natural fats by using a fatty acid as a source for the fatty acid moiety, that has to be introduced into the natural fat. The triglyceride component contains at least 10% of behenic acid, preferably at least 25%. Filling fat compositions contain 35-75%, preferably 40-65% of the triglyceride component. Ice-cream coating compositions contain 40-75% of the triglyceride component.

U.S. Pat. No. 3,686,240 teaches a process for preparing a CBS in which a palm mid-fraction with an iodine value of 38 to 47 and a melting point of 27-31° C. is hydrogenated to a melting point in the range of 33-38° C. so that the amount of trans-fatty acids is less than 5% by weight. The feature of the process is that the formation of the undesirable glycerides of the $S_2E$ and $SE_2$ types is minimised.

WO 03/080779 A1 teaches a method of preparing low-trans fat compositions for confectionery and baking applications. In the method a starting fat composition containing palm oil or a palm oil fraction with a $S_2U$ content between 47 and 75% by weight, a $SU_2+U_3$ content less than 40% by weight, a $S_3$ content between 1 and 15% by weight and a diglyceride content of 3-12% by weight, where S=saturated fatty acids C14-C24 and U=unsaturated fatty acids C14-C24, and wherein the content of unsaturated fatty acids is less than 55% by weight, is subjected to a catalytic hydrogenation so as to obtain a first fat with a trans-fatty acid content of less than 15% by weight and an increase of C18:0 of less than 1% by weight. This first fat is incorporated in a fat composition in a concentration of 1 to 100% by weight.

From the above it can be seen that prior art concerning non-lauric fats with a fast solidification rate has been concentrated on the development of products predominantly containing SUS, i.e. triglycerides of the symmetric type. The following description of related art deals with a fat composition containing triglycerides with a preponderant asymmetric position of the saturated and unsaturated fatty acid residues.

WO 03/037095 A1 teaches a non-lauric, non-trans, non-temper (Non-LTT) fat composition with contents of lauric acid and trans-fatty acids of max. 1%. The Non-LTT fat composition is obtained as a fraction from a randomised triglyceride mixture in which min. 90% of the constituent fatty acids are: Palmitic, stearic, arachidic, behenic, oleic and linoleic acid and the total content of arachidic and behenic acids is 3-40% and the total content of palmitic and stearic acids is 25-60%.

The obtained fraction has the following physical and chemical properties:

1. Slip melting point <36° C., and solid fat content >25% at 25° C.
2. Total content of saturated fatty acids: 40-75%, preferably 45-70%
3. Total content of arachidic and behenic acids: 3-40%, preferably 5-35%, and total content of palmitic and stearic acids: 25-60%, preferably 25-50%
4. Total content of triglycerides having triglyceride composition of C56-C60 measured by number of total carbon atoms of constituent fatty acids: min. 9%, preferably min. 15%
5. Total content of $S_2U$-type triglycerides: min. 25%, preferably min. 35%, where S=saturated fatty acids and U=unsaturated fatty acids The asymmetric Non-LTT fat composition has a fast solidification rate with a n onset in the temperature range of 36-22° C. measured by differential scanning calorimetry.

According to the description and claim 2 of WO 03/037095 A1 the fat composition has a molar content of behenic acid that is higher than that of arachidic acid. The effect of this on the onset of solidification is illustrated in Example 1 for fat compositions with contents of behenic acid in the range from 6.4% to 27.5% and arachidic acid in the range 2.1% to 6.1%.

OBJECTS OF THE INVENTION

An object of the invention is to provide low-trans fat compositions that have a fast solidification rate and at the same time solidify in a stable form without any pre-treatment.

Another object is to provide fat compositions having a steep SFC-melting profile based on vegetable oils predominantly consisting of asymmetric triglycerides with a low content of lauric acid, A further object of the invention is to provide a low-trans CBR with fair cocoa butter tolerance having a fast solidification rate and being bloom-stable.

A still further object of the invention is to provide a range of products based on such fat compositions suitable for food and non-food applications.

SUMMARY OF THE INVENTION

We have found that these objectives are fulfilled by the fat compositions of the invention comprising a triglyceride mixture the constituent fatty acids of which are composed of 40-70% by weight of palmitic, stearic and arachidic acid residues, 25-60% by weight of oleic, linoleic, linolenic and C18-trans-unsaturated fatty acid residues of which max. 15% by weight are C18-trans-unsaturated fatty acid residues, and 0-5% by weight of other fatty acid residues of which max. 3% by weight are behenic acid residues, wherein the total content of $S_2U$ types of triglycerides is 35-90%, preferably 45-85%, and most preferably 55-80% by weight, the ratio SSU/SUS types of triglycerides is >1, preferably >1.5, and the total content of $S_3$ types of triglycerides is max. 15% by weight, where S=saturated fatty acids and U=unsaturated fatty acids, the fat composition optionally further comprising up to 5% by weight of sorbitantristearate based on the total fat composition, with the proviso that at least one of the following conditions is complied with:
i) min. 1% by weight of the fatty acid residues in the fat composition are C18-trans-unsaturated fatty acid residues; or
ii) the fat composition contains min. 1% by weight of $S_3$ types of triglycerides; or
iii) the fat composition contains min. 1% by weight of sorbitantristearate.

The objective are also fulfilled by a fat composition comprising a low melting fat fraction consisting of a triglyceride mixture the constituent fatty acids of which are composed of 40-70% by weight of palmitic, stearic and arachidic acid residues, 25-60% by weight of oleic, linoleic, linolenic and C18-trans-unsaturated fatty acid residues of which max. 1% by weight are C18-trans-unsaturated fatty acid residues, and 0-5% by weight of other fatty acid residues of which max. 3% by weight are behenic acid residues, wherein the total content of $S_2U$ types of triglycerides is 35-90% by weight, the ratio SSU/SUS types of triglycerides is >1, preferably >1.5, and the total content of $S_3$ types of triglycerides is max. 2% by weight, where S=saturated fatty acids and U=unsaturated fatty acids, said fat composition further comprising one or more high melting fatty components in such amount that it exhibits an increase in solid fat content (SFC) at 20° C. compared to the corresponding composition without said high melting fatty components, which is more than double the increase in SFC at 35° C., i.e. the ratio $\Delta SFC_{20°C}/\Delta SFC_{35°C}$ is min. 2, the SFC being determined according to IUPAC 2.150a, and the high melting fatty components being selected from the group consisting of: sorbitantristearate, $S_3$ types of triglycerides and $S_2E$ and $SE_2$ types of triglycerides, where S=saturated fatty acids and E=C18-trans-unsaturated fatty acids, the total fat composition comprising max. 15% by weight of C18-trans-unsaturated fatty acid residues, max. 15% by weight of $S_3$ types of triglycerides, and max. 5% by weight of sorbitantristearate, and at least one of the following conditions being complied with:
i) min. 1% by weight of the fatty acid residues in the fat composition are C18-trans-unsaturated fatty acid residues; or
ii) the fat composition contains min. 1% by weight of $S_3$ types of triglycerides; or
iii) the fat composition contains min. 1% by weight of sorbitantristearate.

Thus, fat compositions of the invention have a high proportion of di-saturated mono-unsaturated fatty acid triglycerides with a preponderant asymmetric position of the saturated and unsaturated fatty acid residues, and they further comprise high melting fatty components selected from the group consisting of triglycerides containing C18-trans-unsaturated fatty acid residues, $S_3$ types of triglycerides and sorbitantristearate.

In these fat compositions the difference between solid fat content (SFC) at 20° C. and solid fat content (SFC) at 35° C. is at least 35%, preferably at least 40% and more preferably at least 45%, the SFC being determined according to IUPAC 2.150a.

When the fat compositions of the invention comprise triglycerides containing C18-trans-unsaturated fatty acid residues, the proportion of C18-trans-unsaturated fatty acid residues is preferably 1-12% by weight, more preferably 2-12% by weight.

When the fat compositions of the invention comprise $S_3$ types of triglycerides, the content of $S_3$ types of triglycerides is preferably in the range of 1-12% by weight, more preferably 2-8% by weight.

When the fat compositions of the invention comprise sorbitantristearate, the content of sorbitantristearate is preferably in the range of 0.5-3.5% by weight, more preferably 1-2% by weight.

The fat compositions of the invention are non-temper fats, which are preferably based on vegetable oils. They may further contain food grade additives such as emulsifiers, antioxidants, flavours and colouring agents.

The fat compositions of the invention can be prepared by a method, which comprises
(a) interesterifying a starting triglyceride mixture based on vegetable fats and with a content of C18-trans-unsaturated fatty acid residues and fractionating the interesterified mixture to obtain a triglyceride mixture the constituent fatty acids of which are composed of 40-70% by weight of palmitic, stearic and arachidic acid residues, 25-60% by weight of oleic, linoleic, linolenic and C18-trans-unsaturated fatty acid residues of which 1-15% by weight are C18-trans-unsaturated fatty acid residues, and 0-5% by weight of other fatty acid residues of which max. 3% by weight are behenic acid residues, and wherein the total content of $S_2U$ types of triglycerides is 35-90%, preferably 45-85%, and most preferably 55-80% by weight, the ratio SSU/SUS types of triglycerides is >1, preferably >1.5, and the total content of $S_3$ types of triglycerides is max. 15% by weight, where S=saturated fatty acids and U=unsaturated fatty acids, and thereafter optionally adding up to 5% by weight of sorbitantristearate based on the total fat composition; or
(b) interesterifying a starting triglyceride mixture based on vegetable fats and fractionating the interesterified mixture, optionally after or followed by hydrogenation, to obtain a triglyceride mixture the constituent fatty acids of which are composed of 40-70% by weight of palmitic, stearic and arachidic acid residues, 25-60% by weight of oleic, linoleic, linolenic and C18-trans-unsaturated fatty acid residues of which max. 15% by weight are C18-trans-unsaturated fatty acid residues, and 0-5% by weight of other fatty acid residues of which max. 3% by weight are behenic acid residues, and wherein the total content of $S_2U$ types of triglycerides is 35-90%, preferably 45-85%, and most preferably 55-80% by weight, the ratio SSU/SUS types of triglycerides is >1, preferably >1.5, and the total content of $S_3$ types of triglycerides is max. 15% by weight, where S=saturated fatty acids and U=unsaturated fatty acids, and thereafter optionally adding up to 5% by weight of sorbitantristearate based on the total fat composition; or
(c) interesterifying a starting triglyceride mixture based on vegetable fats and fractionating the interesterified mixture, optionally after or followed by addition of high melting fatty components selected from the group consisting of $S_3$, $S_2E$ and $SE_2$ types of triglycerides, where S=saturated fatty acids and E=C18-trans-unsaturated fatty acids, to obtain a triglyceride mixture the constituent fatty acids of which are composed of 40-70% by weight of palmitic, stearic and arachidic acid residues, 25-60% by weight of oleic, linoleic, linolenic and C18-trans-unsaturated fatty acid residues of which max. 15% by weight are C18-trans-unsaturated fatty acid residues, and 0-5% by weight of other fatty acid residues of which max. 3% are behenic acid residues, and wherein the total content of $S_2U$ types of triglycerides is 35-90% by weight, preferably 45-85% by weight, most preferably 55-80% by weight, the ratio SSU/SUS types of triglycerides is >1, preferably >1.5, and the total content of $S_3$ types of triglycerides is max. 15% by weight, where S=saturated fatty acids and U=unsaturated fatty acids, and thereafter optionally adding up to 5% by weight of sorbitantristearate based on the total fat composition.

Thus, C18-trans-unsaturated fatty acid residues may be present in the starting triglyceride mixture in method (a), formed in method (b) or added as $S_2E$ and $SE_2$ types of triglycerides in method (c), preferably in such amount as to obtain a percentage of C18-trans-unsaturated fatty acid residues of 1-12% by weight, more preferably 2-12% by weight, in the final fat composition.

$S_3$ types of triglycerides may be left in the fractionation, formed by hydrogenation or added, preferably in such amount as to obtain a content of $S_3$ types of triglycerides of 1-12% by weight, more preferably 2-8% by weight, in the final fat composition.

Sorbitantristearate may be added, preferably in such amount as to obtain a content of sorbitantristearate of 0.5-3.5% by weight, more preferably 1-2% by weight, in the final fat composition.

In the method of the invention the product is a final fat composition having a high proportion of di-saturated mono-unsaturated fatty acid triglycerides with a preponderant asymmetric position of the saturated and unsaturated fatty acid residues and further comprising high melting fatty components selected from the group consisting of triglycerides containing C18-trans-unsaturated fatty acid residues, $S_3$ types of triglycerides and sorbitantristearate. Such product exhibits an increase in solid fat content (SFC) at 20° C. compared to the corresponding composition without said high melting fatty components, which is more than double the increase in SFC at 35° C., i.e. the ratio $\Delta SFC_{20°C.}/\Delta SFC_{35°C.}$ is min. 2, the SFC being determined according to IUPAC 2.150a.

The fat compositions of the invention can be used as components of oils and fats, which are to be incorporated in food products for humans and other mammals.

Thus, a fat composition of the invention may be used as an ingredient in confectionery, bakery and dairy fillings in concentrations of 5-60% by weight, preferably 10-50% by weight, or as an ingredient in confectionery coating compounds in concentrations of 1-55% by weight, preferably 1-40% by weight, or as an ingredient in chocolate and chocolate-like products in a concentration of 5-50% by weight.

Also, the fat compositions of the invention can be used as ingredients in cosmetics, pharmaceuticals or pharma-like (OTC) products.

The invention further includes fat compositions for confectionery applications comprising 98-5% by weight of oils or fats and 2-95% by weight of a fat composition as described above.

DESCRIPTION OF THE DRAWINGS

The results are obtained from Example 1 and summarised in the following.

It can be seen that products of the invention exhibit an increase in solid fat content (SFC) at 20° C. compared to the corresponding composition without said high melting fatty components, and that the difference between SFC at 20° C. and SFC at 35° C. is at least 35%.

The results are obtained from Example 2 and summarised in the following.

It can be seen that products of the invention containing high melting fatty components exhibit an increase in solid fat content (SFC) at 20° C. compared to the corresponding composition without said high melting fatty components, which is more than double the increase in SFC at 35° C., i.e. the ratio $\Delta SFC_{20°C.}/\Delta SFC_{35°C.}$ is min. 2.

The reference oil (PMF), which is highly symmetric in the $S_2U$ types of triglycerides exhibits approximately the same increase in SFC at 20° C. and 35° C., i.e. the ratio $\Delta SFC_{20°C.}/\Delta SFC_{35°C.}$ is approximately 1.

DETAILED DESCRIPTION OF THE INVENTION

Figure 1:
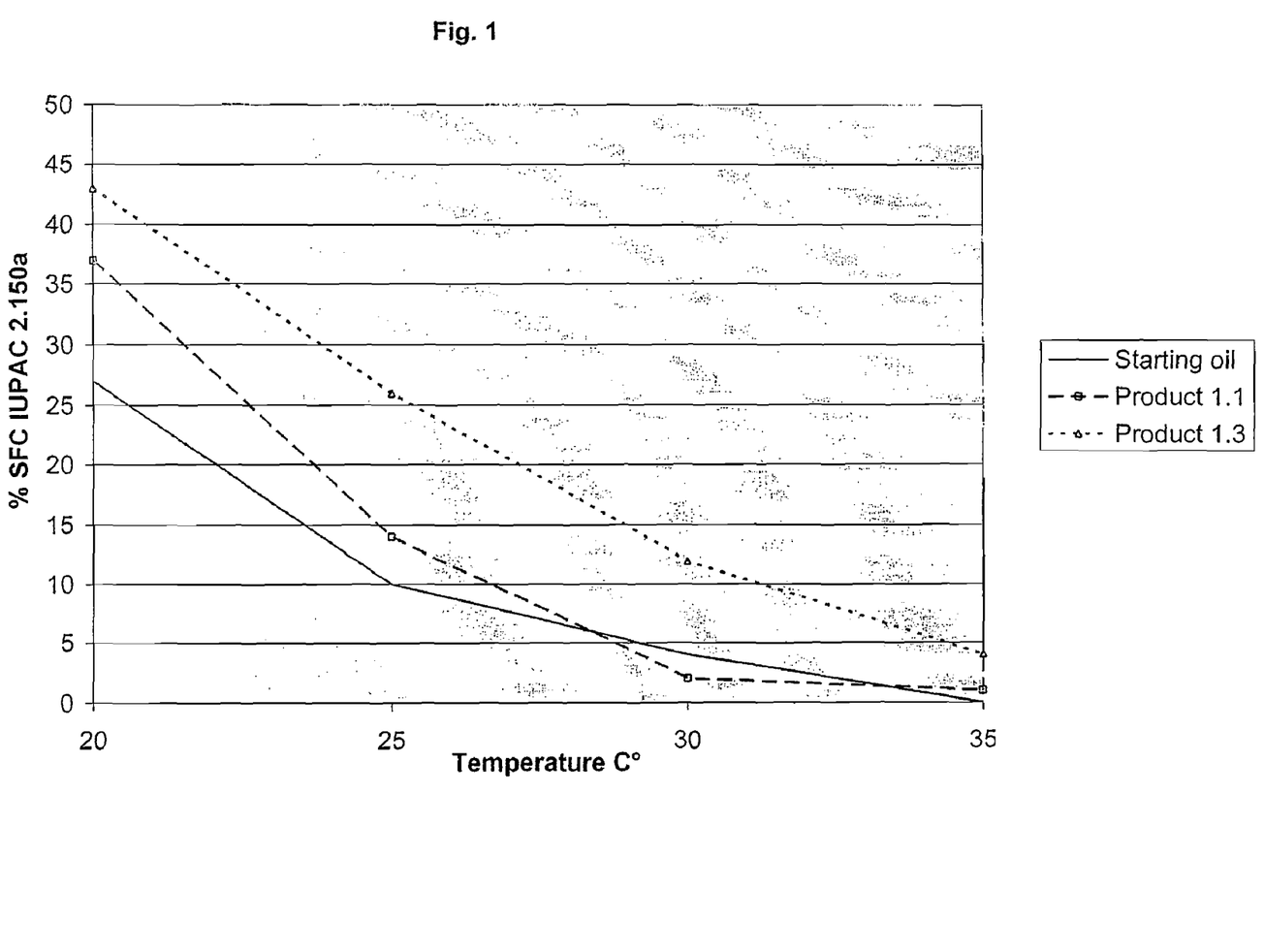
FIG. 1 illustrates the SFC-melting characteristics of some of the fat compositions of the invention in comparison with the starting oil predominantly consisting of triglycerides of the asymmetric type, to which different types of high melting fats are added.
Figure 2:
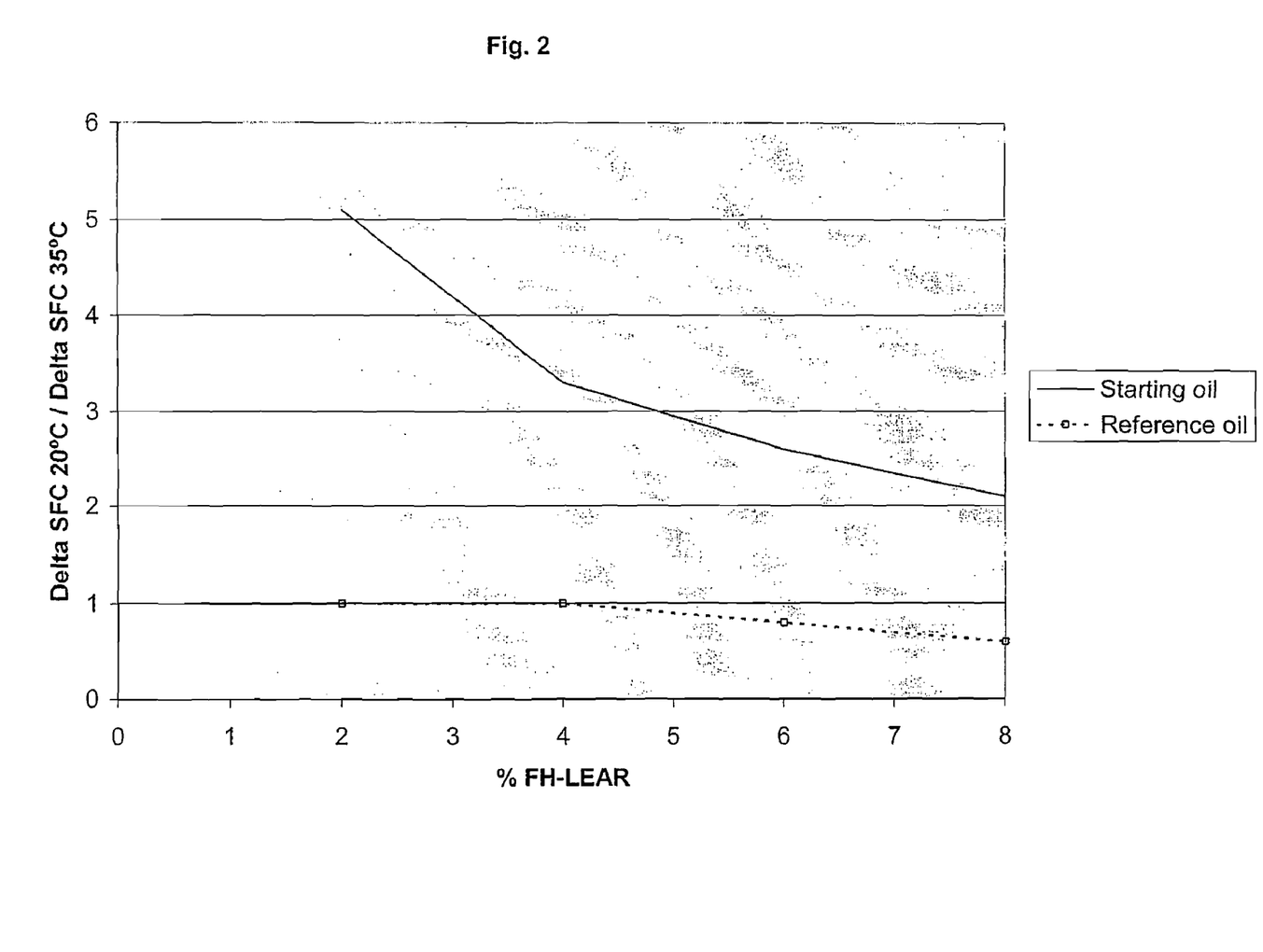
FIG. 2 illustrates the ratio $\Delta SFC_{20°C.}/\Delta SFC_{35°C.}$ as a function of the content of a high melting fatty component in an asymmetric starting oil vs. that of a symmetric reference oil.

We have found, that low-lauric, low-trans fat compositions, which have a steep SFC-melting profile and a fast solidification rate, and which at the same time solidify in a stable form, can be obtained from a starting triglyceride mixture based on vegetable fats, by (a) interesterifying a starting triglyceride mixture based on vegetable fats and with a content of C18-trans-unsaturated fatty acid residues and fractionating the interesterified mixture to obtain a triglyceride mixture the constituent fatty acids of which are composed of 40-70% by weight of palmitic, stearic and arachidic acid residues, 25-60% by weight of oleic, linoleic, linolenic and C18-trans-unsaturated fatty acid residues of which 1-15% by weight are C18-trans-unsaturated fatty acid residues, and 0-5% by weight of other fatty acid residues of which max. 3% by weight are behenic acid residues, and wherein the total content of $S_2U$ types of triglycerides is 35-90%, preferably 45-85° C., and most preferably 55-80% by weight, the ratio SSU/SUS types of triglycerides is >1, preferably >1.5, and the total content of $S_3$ types of triglycerides is max. 15% by weight, where S=saturated fatty acids and U=unsaturated fatty acids, and thereafter optionally adding up to 5% by weight of sorbitantristearate based on the total fat composition; or (b) interesterifying a starting triglyceride mixture based on vegetable fats and fractionating the interesterified mixture, optionally after or followed by hydrogenation, to obtain a triglyceride mixture the constituent fatty acids of which are composed of 40-70% by weight of palmitic, stearic and arachidic acid residues, 25-60% by weight of oleic, linoleic, linolenic and C18-trans-unsaturated fatty acid residues of which max. 15% by weight are C18-trans-unsaturated fatty acid residues, and 0-5% by weight of other fatty acid residues of which max. 3% by weight are behenic acid residues, and wherein the total content of $S_2U$ types of triglycerides is 35-90%, preferably 45-85%, and most preferably 55-80% by weight, the ratio SSU/SUS types of triglycerides is >1, preferably >1.5, and the total content of $S_3$ types of triglycerides is max. 15% by weight, where S=saturated fatty acids and U=unsaturated fatty acids, and thereafter optionally adding up to 5% by weight of sorbitantristearate based on the total fat composition; or (c) interesterifying a starting triglyceride mixture based on vegetable fats and fractionating the interesterified mixture, optionally after or followed by addition of high melting fatty components selected from the group consisting of $S_3$, $S_2E$ and $SE_2$ types of triglycerides, where S=saturated fatty acids and E=C18-trans-unsaturated fatty acids, to obtain a triglyceride mixture the constituent fatty acids of which are composed of 40-70% by weight of palmitic, stearic and arachidic acid residues, 25-60% by weight of oleic, linoleic, linolenic and C18-trans-unsaturated fatty acid residues of which max. 15% by weight are C18-trans-unsaturated fatty acid residues, and 0-5% by weight of other fatty acid residues of which max. 3% are behenic acid residues, and wherein the total content of $S_2U$ types of triglycerides is 35-90% by weight, preferably 45-85% by weight, most preferably 55-80% by weight, the ratio SSU/SUS types of triglycerides is >1, preferably >1.5, and the total content of $S_3$ types of triglycerides is max. 15% by weight, where S=saturated fatty acids and U=unsaturated fatty acids, and thereafter optionally adding up to 5% by weight of sorbitantristearate based on the total fat composition.

If similar methods are performed without the inclusion of the high melting fatty components selected from the group consisting of triglycerides containing C18-trans-unsaturated fatty acid residues, $S_3$ types of triglycerides and sorbitantristearate, the result is a triglyceride mixture largely composed of asymmetric triglycerides and having a low solidification rate with a rather flat SFC melting profile. It has surprisingly been found that when incorporating certain amounts of high melting fatty components in this mixture by the method of the invention the SFC at 20° C. vs. that at 35° C. increases by a factor of min. 2, i.e. the ratio $\Delta SFC_{20°C.}/\Delta SFC_{35°C.}$ is min. 2. The result is a final fat composition having a steep SFC melting profile and thus a much faster solidification rate.

Thus, for the fat composition of the invention the difference between solid fat content (SFC) at 20° C. and solid fat content (SFC) at 35° C. is at least 35%, preferably at least 40% and more preferably at least 45%.

It is surprising that an interesterified and fractionated fat with a high content of saturated fatty acids has such a low solid fat content at 20° C. as illustrated in Examples 1-4. A person skilled in the art would expect much more solid fat e.g. 45-55% to be present at room temperature as this is normally seen in triglyceride mixtures with such a high content of $S_2U$ triglycerides types. Furthermore, it is surprising that an inclusion of a relatively low amount of high melting fatty components in such asymmetric triglyceride mixtures result in a considerable increase in solid fat content at 20° C. and to a much lesser extent at 35° C. This makes the fats of the invention suited for applications in products where a final melting around and below body temperature is appreciated, e.g. confectionery and cosmetic products.

A further aspect of the invention is the use of relatively cheap by-products from the fractionation of vegetable oils, such as the high melting top fractions that are normally used for the production of emulsifiers and hardstock for margarine and the soft olefin fractions that are normally used as industrial bulk oils e.g. for margarine and deep fat frying, as raw materials for the more valuable fat compositions of the invention.

The invention will be better understood with reference to the following examples that are illustrative and should not be taken as limiting the scope of the present invention as described in the claims.

EXAMPLES

Example 1

Starting Oil with Added High Melting Fatty Components

The following vegetable oil mixture was interesterified to fully randomise the fatty acid moieties:

| | |
|---|---|
| Fully hydrogenated, low erucic acid rapeseed oil | 22.2% |
| Palm stearin (iodine value, IV = 35) | 69.1% |
| Palm olein (iodine value, IV = 56) | 8.7% |

The resulting interesterified oil was fractionated in hexane to remove the high melting fraction. The lower melting fraction was desolventised to yield a starting oil with the following composition:

| | |
|---|---|
| Triglycerides: | $S_2U$ = 69.5% |
| | $U_3$ = 3.5% |
| | $S_3$ < 2% |
| | the rest being $SU_2$ types of triglycerides. |
| Fatty acids: | saturated = 55% |
| | mono-unsaturated = 37% |
| | di-unsaturated = 8% |

To the starting oil was added various high melting fatty components to give the following products of the invention:
Product 1.1=Starting oil+2% sorbitantristearate
Product 1.2=Starting oil+5% fully hydrogenated, low erucic acid rapeseed oil (FH-LEAR), containing approx. 100% $St_3$ (S=approx. 95% stearic acid and 5% palmitic acid).
Product 1.3=Starting oil+5% palm oil top fraction (IV=12), containing 40% $P_3$ (tripalmitin)
Product 1.4=Starting oil+10% trans hydrogenated soybean oil, primarily consisting of $S_2E$ and $SE_2$.
Reference starting oil=Palm midfraction (IV=45).
Reference product, not part of the invention=Palm midfraction (IV=45)+5% palm oil top fraction (IV=12), containing 40% $P_3$ (tripalmitin).

The melting behaviour of the products is summarised in the following table:

| | Parameter | | | | | | |
|---|---|---|---|---|---|---|---|
| | Solid fat content (SFC) in %, according to IUPAC 2.150a | | | | $\Delta$ | $\Delta$ | $\Delta SFC_{20°C.}/$ |
| Product | 20° C. | 25° C. | 30° C. | 35° C. | $SFC_{20°C.}$ | $SFC_{35°C.}$ | $\Delta SFC_{35°C.}$ |
| Starting oil | 27 | 10 | 4 | 0 | — | — | — |
| Product 1.1 | 37 | 14 | 2 | 1 | 10 | 1 | 10 |
| Product 1.2 | 49 | 30 | 15 | 8 | 22 | 8 | 2.8 |
| Product 1.3 | 43 | 26 | 12 | 4 | 16 | 4 | 4 |
| Product 1.4 | 49 | 27 | 4 | 1 | 22 | 1 | 22 |
| Ref. starting oil | 40 | 10 | 2 | 0 | — | — | — |
| Ref. product | 48 | 20 | 8 | 5 | 8 | 5 | 1.6 |

From this it can be seen that the addition of various types of high melting fatty components to the very soft asymmetric starting oil will result in fat compositions of the invention with a steep SFC-melting profile.

The following table shows that the difference between solid fat content at 20° C. and solid fat content at 35° C. is greater than 35% and comparable to that of a known temper fat, predominantly consisting of symmetric triglycerides.

| | Parameter | | | | |
|---|---|---|---|---|---|
| | Solid fat content (SFC) in %, according to IUPAC 2.150a | | | | $SFC_{20°\,C.}$ minus |
| Product | 20° C. | 25° C. | 30° C. | 35° C. | $SFC_{35°\,C.}$ |
| Starting oil | 27 | 10 | 4 | 0 | 27 |
| Product 1.1 | 37 | 14 | 2 | 1 | 36 |
| Product 1.2 | 49 | 30 | 15 | 8 | 41 |
| Product 1.3 | 43 | 26 | 12 | 4 | 39 |
| Product 1.4 | 49 | 27 | 4 | 1 | 48 |

| | Parameter | | | | |
|---|---|---|---|---|---|
| | Solid fat content (SFC) in %, according to IUPAC 2.150a | | | | $SFC_{20°\,C.}$ minus |
| Product | 20° C. | 25° C. | 30° C. | 35° C. | $SFC_{35°\,C.}$ |
| Ref. starting oil | 40 | 10 | 2 | 0 | 40 |
| Ref. product | 48 | 20 | 8 | 4 | 44 |

Example 2

Starting Oil and Reference Oil with Varying Amounts of a High Melting Fatty Component Added A starting oil with a $S_2U$ content of 73% was prepared as described in Example 1. To this starting oil varying amounts of fully hydrogenated, low erucic acid rapeseed oil (FH-LEAR) was added.

The melting behaviour of the products is summarised in the following table:

| | Parameter | | | | | | |
|---|---|---|---|---|---|---|---|
| | Solid fat content (SFC) in %, according to IUPAC 2.150a | | | | Δ | Δ | $\Delta SFC_{20°\,C.}/$ |
| Product | 20° C. | 25° C. | 30° C. | 35° C. | $SFC_{20°\,C.}$ | $SFC_{35°\,C.}$ | $\Delta SFC_{35°\,C.}$ |
| Starting oil | 33.3 | 14.8 | 3.9 | 0 | — | — | — |
| +2% FH-LEAR | 48.7 | 21.7 | 8.2 | 3.0 | 15.4 | 3.0 | 5.1 |
| +4% FH-LEAR | 53.3 | 27.0 | 12.7 | 6.0 | 20.0 | 6.0 | 3.3 |
| +6% FH-LEAR | 55.6 | 31.6 | 15.6 | 8.7 | 22.3 | 8.7 | 2.6 |
| +8% FH-LEAR | 58.1 | 35.6 | 19.9 | 12.0 | 24.8 | 12.0 | 2.1 |

From the results it can be seen that the increase in SFC at 20° C. is more than two times the increase in SFC at 35° C., i.e. $\Delta SFC_{20°\,C.}/\Delta SFC_{35°\,C.}>2$.

This confirms that the addition of various amounts of a high melting fatty component to the very soft asymmetric starting oil results in fat compositions of the invention with a steep SFC-melting profile.

As a reference, a palm midfraction (IV=45) was used as starting oil to which varying amounts of FH-LEAR was added. The melting behaviour of the reference products is summarised in the following table:

| | Parameter | | | | | | |
|---|---|---|---|---|---|---|---|
| | Solid fat content (SFC) in %, according to IUPAC 2.150a | | | | Δ | Δ | $\Delta SFC_{20°\,C.}/$ |
| Product | 20° C. | 25° C. | 30° C. | 35° C. | $SFC_{20°\,C.}$ | $SFC_{35°\,C.}$ | $\Delta SFC_{35°\,C.}$ |
| Starting oil | 39.3 | 7.9 | 1.5 | 0.0 | — | — | — |
| +2% FH-LEAR | 40.9 | 11.7 | 4.6 | 1.6 | 1.6 | 1.6 | 1.0 |
| +4% FH-LEAR | 43.6 | 16.2 | 8.0 | 4.2 | 4.3 | 4.2 | 1.0 |
| +6% FH-LEAR | 44.9 | 20.0 | 10.9 | 7.3 | 5.6 | 7.3 | 0.8 |
| +8% FH-LEAR | 45.9 | 23.4 | 13.5 | 9.8 | 6.3 | 9.8 | 0.6 |

From the results it can be seen that the increase in SFC at 20° C. is equal to or less than the increase in SFC at 35° C., i.e. $\Delta SFC_{20°C.}/\Delta SFC_{35°C.} <= 1$.

This shows that addition of a high melting fatty component to an oil predominantly consisting of triglycerides of the symmetric type results in fat compositions having almost parallel SFC-melting curves.

Example 3

Starting Oils with Different SSU/SUS Ratio to which a High Melting Fatty Component is Added The following vegetable oil mixture was interesterified to fully randomise the fatty acid moieties:

| | |
|---|---|
| Fully hydrogenated, low erucic acid rapeseed oil | 21.5% |
| Palm stearin (iodine value, IV = 35) | 73.8% |
| Fully hydrogenated palm stearin | 4.7% |

The resulting interesterified oil was fractionated in hexane to remove the high melting fraction. The lower melting fraction was desolventised to yield an oil fraction with the following composition:

| | |
|---|---|
| Triglycerides: | $S_2U$ = 70.0% |
| | $U_3$ = 3.5% |
| | $S_3$ < 1% |
| | the rest being $SU_2$ types of triglycerides. |
| Fatty acids: | saturated = 58% |
| | mono-unsaturated = 35% |
| | di-unsaturated = 7% |

To this oil fraction was added different amounts of palm midfraction (IV=45) to obtain starting oils with different SSU/SUS ratios in the range from 0.9 to 2.0.

To the starting oils were added varying amounts of fully hydrogenated, low erucic acid rapeseed oil (FH-LEAR).

The melting behaviour of the resulting products is summarised in the following table:

From the results it can be seen that the addition of the high melting fatty component (FH-LEAR) to the very soft starting oils with varying SSU/SUS ratio will result in fat compositions of the invention with a steep SFC-melting profile, provided that the ratio SSU/SUS is >1, and the content of the high melting fatty component is min. 1%.

For the products of the invention the difference between SFC at 20° C. and SFC at 35° C. is greater than 35%, and it increases with increasing content of asymmetric triglycerides in the starting oil.

Furthermore, it can be seen that the preferred difference of at least 40% between SFC at 20° C. and SFC at 35° C. can be obtained with fat compositions where the ratio SSU/SUS is >1.

Example 4

Starting Oil with High Melting Fatty Components Formed In Situ

The previous examples illustrate the preparation of products of the invention according to method (c).

This example illustrates the preparation of a product of the invention according to method (b).

A starting oil was prepared as described in Example 1. The starting oil had the following analytical data:

Total content of $S_2U$ types of triglycerides=70%

Ratio SSU/SUS types of triglycerides=2

Total content of $S_3$ types of triglycerides <2%

The starting oil was partially hydrogenated to produce a series of products with an increasing total content of C18-trans-unsaturated fatty acids (TFA).

To the starting oil and each of the hydrogenated oils was added 1.5% of sorbitantristearate.

| | Parameter | | | | | | |
|---|---|---|---|---|---|---|---|
| | | Solid fat content (SFC) in %, according to IUPAC 2.150a | | | | | |
| Product | Ratio SSU/SUS | 20° C. | 35° C. | $SFC_{20°C.}$ minus $SFC_{35°C.}$ | $\Delta SFC_{20°C.}$ | $\Delta SFC_{35°C.}$ | Ratio $\Delta SFC_{20°C.}/\Delta SFC_{35°C.}$ |
| Starting oil | 0.9 | 24.6 | 0.0 | 24.6 | — | — | — |
| +1% FH-LEAR | 0.9 | 36.4 | 1.8 | 34.6 | 11.7 | 1.8 | 6.5 |
| Starting oil | 1.2 | 26.6 | 0.0 | 26.6 | — | — | — |
| +3% FH-LEAR | 1.2 | 46.1 | 5.1 | 41.0 | 19.5 | 5.1 | 3.8 |
| Starting oil | 1.4 | 29.4 | 0.0 | 29.4 | — | — | — |
| +3% FH-LEAR | 1.4 | 47.4 | 4.4 | 43.0 | 18.0 | 4.4 | 4.1 |
| Starting oil | 2.0 | 29.0 | 0.0 | 29.0 | — | — | — |
| +1% FH-LEAR | 2.0 | 38.3 | 2.7 | 35.6 | 9.3 | 2.7 | 3.4 |
| +3% FH-LEAR | 2.0 | 51.3 | 5.6 | 45.7 | 22.3 | 5.6 | 4.0 |

The melting behaviour of the resulting products is summarised in the following table:

| | Parameter | | | | | | |
|---|---|---|---|---|---|---|---|
| | Solid fat content (SFC) in %, according to IUPAC 2.150a | | | | Δ | Δ | $\Delta SFC_{20°C}/$ |
| Product | 20° C. | 25° C. | 30° C. | 35° C. | $SFC_{20°C.}$ | $SFC_{35°C.}$ | $\Delta SFC_{35°C.}$ |
| Starting oil 0.4% TFA | 41 | 13 | 2 | 0 | — | — | — |
| 2.1% TFA | 52 | 24 | 6 | 0 | 11 | 0 | >11 |
| 5.1% TFA | 63 | 39 | 15 | 1 | 22 | 1 | 22 |
| 9.1% TFA | 73 | 53 | 29 | 9 | 32 | 9 | 3.6 |
| 13.9% TFA | 81 | 67 | 48 | 26 | 40 | 26 | 1.5 |

From the results it can be seen that the content of in situ generated amounts of high melting fatty components ($S_2E$ and $SE_2$ types of triglycerides, E=C18-trans-unsaturated fatty acids) in the soft asymmetric starting oil results in fat compositions of the invention with a steep SFC-melting profile.

Example 5

Starting Oil with High Melting Fatty Components Present before Interesterification This example illustrates the preparation of a product of the invention according to method (a).

The following vegetable oil mixture was interesterified to fully randomise the fatty acid moieties:

| | |
|---|---|
| Trans-hydrogenated palm stearin (IV = 18, TFA = 9%) | 30% |
| Fully hydrogenated, low erucic acid rapeseed oil | 15% |
| Palm midfraction (IV = 45) | 5% |
| Trans-hydrogenated palm oil (IV = 39, TFA = 17%) | 50% |

The resulting interesterified oil was fractionated in hexane to remove the high melting fraction. The lower melting fraction was desolventised to yield a product of the invention with the following composition:

| Triglycerides: | $S_2U = 58\%$ |
|---|---|
| | $U_3 = 6\%$ |
| | $S_3 < 2\%$ |
| | the rest being $SU_2$ types of triglycerides. |

The melting behaviour of the resulting product, containing 12% TFA after fractionation, is summarised in the following table:

| | Parameter | | | | |
|---|---|---|---|---|---|
| | Solid fat content (SFC) in %, according to IUPAC 2.150a | | | | $SFC_{20°C.}$ minus |
| Product | 20° C. | 25° C. | 30° C. | 35° C. | $SFC_{35°C.}$ |
| Product of the invention | 55 | 36 | 16 | 3 | 52 |

From the results it can be seen that by interesterifying an oil mixture containing high melting fatty components (triglycerides containing C18-trans-unsaturated fatty acids) followed by fractionation to remove the highest melting fraction, a fat composition of the invention with a steep SFC-melting profile will be obtained.

Example 6

Use of a Fat Composition of the Invention in Confectionery Products

A product of the invention was tested in comparison with three commercially available cocoa butter replacers (CBR). The test products were:

A product of the invention with a content of 11.8% TFA prepared according to Example 4
"Cebao 44-38" (Aarhus United), CBR containing 55% TFA
"Akopol LT 15" (Karlshamns), CBR containing 13% TFA
"Melano LT 130G" (Fuji), CBR containing 7% TFA The above-mentioned products were tested in the following compound compositions:

| | Parameter | |
|---|---|---|
| Product | Compound A | Compound B |
| Ingredients in %: | | |
| Cocoa Powder | 15.00 | 15.00 |
| Cocoa Butter | 0.00 | 2.15 |
| Test product (CBR) | 30.00 | 27.85 |
| Sugar | 49.00 | 49.00 |
| Skim Milk Powder | 6.00 | 6.00 |
| Total fat content in % | 31.65 | 31.65 |
| Cocoa Butter in % of the total fat content | 5.20 | 12.00 |

The two compositions were mixed in a Hobart N-50 mixer at 50° C. for 10 minutes. The resulting mass was refined in a Bühler SDY-300 three-roll refiner to a particle size of 20-25 μm. Thereafter, the products were conched in the Hobart machine for six hours at 60° C., and finally 0.4% lecithin and 0.05% vanillin was added.

6.1 Test as Compound Coating

The compounds were transferred to a Nielsen Baby Flex enrober and used at 40° C. to coat spun-cake pieces of 3×3 cm followed by cooling in a Blume & Co three-stage cooling tunnel. The temperature settings were 6° C. in the first zone, 5° C. in the second zone and 14° C. in the final zone. The total cooling times used were: 3, 6, 9, 12, 15 and 18 minutes.

The coatings were evaluated immediately after each cooling period. The products passed the sensory test, when they were non greasy and ready to pack.

The results are summarised in the following table:

| Test product (CBR) | Solidification time in minutes | |
|---|---|---|
| | Compound A | Compound B |
| Product of the invention | 9 | 9 |
| "Cebao 44-38" | 6 | 6 |
| "Akopol LT 15" | 12 | 12 |
| "Melano LT 130G" | 12 | 12 |

Comments: The results prove that a product of the invention has a faster solidification rate than commercially available low-trans alternatives.

6.2 Test as Compounded Bar

The compounds were transferred into 100 g moulds at 40° C. followed by cooling in a Blume & Co three-stage cooling tunnel. The temperature settings were 6° C. in the first zone, 5° C. in the second zone and 14° C. in the final zone. The total cooling time used was 30 minutes. The bars were evaluated immediately after the cooling period. If the bars were not released from the moulds after the cooling period, the cooling cycle was repeated.

The results are summarised in the following table:

| Test product (CBR) | Solidification time in minutes | |
|---|---|---|
| | Compound A | Compound B |
| Product of the invention | 30 | 30 |
| "Cebao 44-38" | 30 | 30 |
| "Akopol LT 15" | 60 | 60 |
| "Melano LT 130G" | 60 | 60 |

Comments: The results indicate that a product of the invention performed as well as a traditional high-trans CBR and had a solidification time that was half of that of the low-trans reference fats.

The moulded bars were visually evaluated for bloom stability in an isothermal test at 20° C.

The results are summarised in the following table:

| Test product (CBR) | Bloom stability in weeks | |
|---|---|---|
| | Compound A | Compound B |
| Product of the invention | >15 | >15 |
| "Cebao 44-38" | >52 | >52 |
| "Arkopol LT 15" | 6 | 2 |
| "Melano LT 130G" | >6 | 6 |

Comments: From the results it can be seen, that the well known high-trans CBR is superior in bloom stability, but the product of the invention provide a better bloom stability than the low-trans reference fats in the test.

Example 7

Use of a Fat Composition of the Invention in a Lip Balm Formulation

The product of the invention from Example 5 was tested in the following lip balm formulation:

| Ingredient/ Trade Name | CTFA/ INCI Name | Test Composition | Reference Composition |
|---|---|---|---|
| "Cegesoft PS-6" | Vegetable Oil | 8% | 8% |
| "Lorol 16" | Cetyl Alcohol | 13% | 13% |
| "Illexao 30-61" | Palm Glycerides | — | 6% |
| Product, Ex. 5 | — | 6% | — |
| White Beeswax | Beeswax | 5% | 5% |
| "Rilanit IBO" | Butyl Oleate | 13% | 13% |
| White Vaseline | Petrolatum | 55% | 55% |

Note:
All amounts are % by weight. "Cegesoft", "Lorol" and "Rilanit" are trade names of Cognis Deutschland GmbH. "Illexao" is a trade name of Aarhus United A/S and "Illexao 30-61" is a CBE-type fat with melting point 34° C.

All the ingredients were heated to 75° C. and mixed. The mixture was filled into 5 ml tubes at 50° C. and cooled to room temperature.

Three skilled panellists tested the two lip balm sticks. The two sticks performed well, but when applied to the skin the test composition was slightly softer than the reference containing "Illexao 30-61", making the test composition suited as an excipient in a medicinal preparation.

This example demonstrates the compatibility of a fat of the invention with non-glyceridic ingredients normally used in cosmetic and pharmaceutical formulations.

The invention claimed is:

1. A fat composition comprising a triglyceride mixture, the constituent fatty acids of which are composed of:
   (a) 40-70% by weight of palmitic, stearic and arachidic acid residues
   (b) 25-60% by weight of oleic, linoleic, linolenic and C18-trans-unsaturated fatty acid residues, of which not more than 15% by weight are C18-trans-unsaturated fatty acid residues; and
   (c) 0-5% by weight of other fatty acid residues, of which not more than 3% by weight are behenic acid residues, wherein:
   the total content of $S_2U$ types of triglycerides is 35-90% by weight,
   the ratio SSU/SUS types of triglycerides is greater than 1,
   the total content of $S_3$ types of triglycerides is not more than 15% by weight, where S=saturated fatty acids and U=unsaturated fatty acids, and
   said fat composition contains at least 1% by weight of one or more high melt fatty components selected from the group consisting of (i) one or more triglycerides of C18-trans-unsaturated fatty acid residues, (ii) $S_3$ types of triglycerides and (iii) sorbitantristearate,
   and further wherein said fat composition exhibits an increase in solid fat content (SFC) at 20° C., compared to a corresponding composition without the one or more high melt fatty components, that is more than twice the increase in SFC at 35° C.

2. Fat composition according to claim 1, wherein the total content of $S_2U$ types of triglycerides is 45-85% by weight.

3. Fat composition according to claim 1, wherein the proportion of C18-trans-unsaturated fatty acid residues is 1-12% by weight.

4. Fat composition according to claim 1, wherein the total content of $S_3$ types of triglycerides is 1-12% by weight.

5. Fat composition according to claim 1, wherein the content of sorbitantristearate is 0.5-3.5% by weight.

6. Fat composition according to claim 1, wherein the difference between solid fat content (SFC) at 20° C. and solid fat content (SFC) at 35° C. is at least 35%, the SFC being determined according to IUPAC 2.150a.

7. Fat composition according to claim 1, which is a non-temper fat based on vegetable oils.

8. Fat composition according to claim 1 further containing food grade additives such as emulsifiers, antioxidants, flavours and colouring agents.

9. A fat composition for confectionery applications comprising 5-98% by weight of oils or fats and 2-95% by weight of a fat composition according to claim 1.

10. A fat composition according to claim 1, wherein the ratio of SSU/SUS types of triglycerides is greater than 1.5.

11. A fat composition according to claim 2, wherein the total content of $S_2U$ types of triglycerides is 55-80% by weight.

12. A fat composition according to claim 3, wherein the proportion of C18-trans-unsaturated fatty acid residues is 2-12% by weight.

13. A fat composition according to claim 4, wherein the total content of $S_3$ types of triglycerides is 2-8% by weight.

14. A fat composition according to claim 5, wherein the content of sorbitantristearate is 1-2% by weight.

15. A fat composition according to claim 6, wherein the difference between solid fat content (SFC) at 20° C. and solid fat content (SFC) at 35° C. is at least 40%.

16. A fat composition according to claim 15, wherein the difference between solid fat content (SFC) at 20° C. and solid fat content (SFC) at 35° C. is at least 45%.

17. A fat composition according to claim 1, further comprising up to 5% by weight of sorbitantristearate based on the total fat composition.

* * * * *